United States Patent [19]
Horinouchi et al.

[11] Patent Number: 5,377,177
[45] Date of Patent: Dec. 27, 1994

[54] OPTICAL PICKUP HAVING FIRST AND SECOND REFLECTING SURFACES AND HOLOGRAM

[75] Inventors: Syougo Horinouchi; Satoshi Kiyomatsu; Kouki Kojima, all of Fukuoka, Japan

[73] Assignee: Matsushita Electric Industrial Co., Ltd., Osaka, Japan

[21] Appl. No.: 952,224

[22] Filed: Sep. 28, 1992

[30] Foreign Application Priority Data

Sep. 27, 1991 [JP] Japan ................................ 3-249005
Nov. 13, 1991 [JP] Japan ................................ 3-296818

[51] Int. Cl.$^5$ ................................................ G11B 7/00
[52] U.S. Cl. ................................ 369/112; 369/44.24; 369/118
[58] Field of Search ................ 369/44.12, 44.23, 44.24, 369/112, 117, 118

[56] References Cited

U.S. PATENT DOCUMENTS

| | | |
|---|---|---|
| 4,731,772 | 3/1988 | Lee . |
| 4,757,197 | 7/1988 | Lee . |
| 5,070,494 | 12/1991 | Emoto et al. ................ 369/44.23 X |
| 5,111,448 | 5/1992 | Komma et al. ................ 369/44.23 |
| 5,113,386 | 5/1992 | Whitehead et al. ......... 369/44.23 X |
| 5,198,916 | 3/1993 | Kim ............................... 369/44.23 X |

*Primary Examiner*—W. R. Young
*Attorney, Agent, or Firm*—Lowe, Price, LeBlanc & Becker

[57] ABSTRACT

An optical pickup to be used in an optical disc apparatus for optically recording and reproducing information on and from an optical disc. The optical pickup is arranged such that a laser light from a semiconductor laser is reflected plural times within an optical system and then focused on the optical disc and the light from the optical disc is diffracted by a hologram and then received by a light-receiving device for reproducing the information recorded on the optical disc. This arrangement can achieve the size-reduction of the optical pickup concurrently with obtaining a necessary optical path length.

5 Claims, 7 Drawing Sheets

OPTICAL PICKUP HAVING FIRST AND SECOND REFLECTING SURFACES AND HOLOGRAM

BACKGROUND OF THE INVENTION

The present invention relates to an optical pickup to be used in information recording/reproducing apparatus such as an optical disc apparatus for optically recording and reproducing information.

Figure 14:
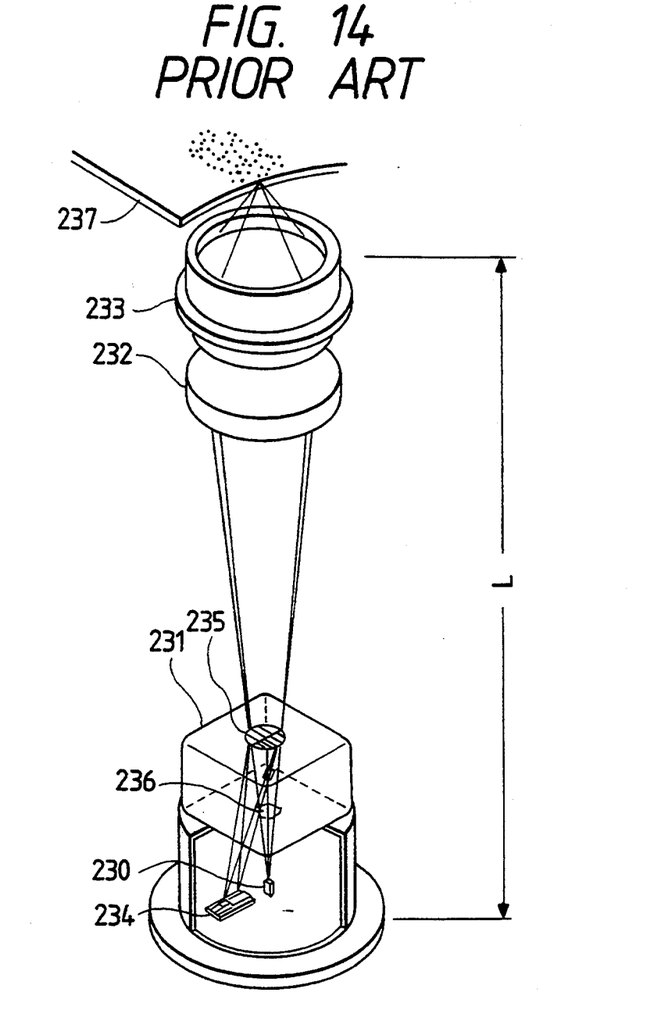
FIG. 14 is an illustration for describing a conventional optical pickup.

Recently, improvement for the optical disc apparatus is being made increasingly for size-reduction and weight-reduction purposes. The size-reduction and weight-reduction also allow improvement of its performance such as shortening the access time. For achieving these purposes, one known technique involves constructing the optical pickup with a hologram optical device. FIG. 14 shows an arrangement of a conventional optical pickup. In FIG. 14, numeral 231 designates a hologram optical device comprising a glass-made base, a hologram 235 provided on the upper surface of the base and a grating 236 provided on the lower surface of the base. As illustrated in FIG. 14, a light emitted from a semiconductor laser 230 is divided by the grating 236 into three beams, i.e., two tracking detecting sub-beams and a signal reading main beam, and directed toward the hologram 235. The light beams passing through the hologram 235 are converted into parallel rays through a collimator lens 232 and then condensed through an objective lens 233 on a disc 237 so as to be reflected thereon. The reflected light including information recorded on the disc 237 again passes through the objective lens 233 and the collimator lens 232 before diffracted by the hologram 235 to be led to a 5-divided photodetector 234. Here, the hologram 235 has 2 areas which are different in grating period from each other, and hence the incident light is wave-front-converted by the hologram 235 so as to be focused (condensed) on a predetermined position of the 5-divided photodetector 234. When a focussing error occurs, the focusing position of the 5-divided photodetector 234 varies, thereby obtaining a focusing error signal. In addition, in response to occurrence of a tracking error, a difference in intensity between the reflected lights of the 2 tracking detecting sub-beams occurs, thereby obtaining a tracking error signal.

There is a problem which arises with such an arrangement of the conventional optical pickup, however, in that the optical length from the semiconductor laser 230 to the objective lens 233 becomes long to make it difficult to reduce the thickness of the optical pickup.

SUMMARY OF THE INVENTION

It is therefore an object of the present invention to provide an optical pickup which allows its size-reduction and improvement of its performance.

According to this invention, in an optical pickup equipped with light-emitting means disposed in opposed relation to an optical disc for emitting light toward the optical disc and light-receiving means disposed in opposed relation to the optical disc for receiving light reflected from the optical disc, a transparent member is disposed between the light-emitting means, the light-receiving means and the optical disc, the transparent member having a first surface facing the optical disc and a second surface facing the light-emitting means and the light-receiving means which first and second surfaces are parallel to each other. On the first surface there are provided a first circular reflection surface for reflecting the light from the light-emitting means, a reflection type hologram for diffracting incident light and a grating lens for focusing light on the optical disc. Further, on the second surface there is provided a second reflection surface for reflecting light, reflected from the first reflection surface, toward the grating lens. In the second reflection surface there are formed an incident window for leading the light from the light-emitting means into the transparent member and an outgoing window for leading diffracted light from the reflection type hologram to the light-receiving means.

Preferably, a distance from the second reflection surface to the light-receiving means is adjusted in accordance with the relation between a wavelength of the light to be emitted from the light-emitting means and a design wavelength of the grating lens, the second reflection surface and the light-receiving means being fixed to each other through a transparent resin after the adjustment. That is, when the wavelength of the light to be emitted from the light-emitting means is longer than the design wavelength of the grating lens, the distance from the second reflection surface to the light-receiving means is arranged to be shorter than a design value, and when the wavelength of the light to be emitted from the light-emitting means is shorter than the design wavelength of the grating lens, the distance from the second reflection surface to the light-receiving means is arranged to be longer than the design value.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
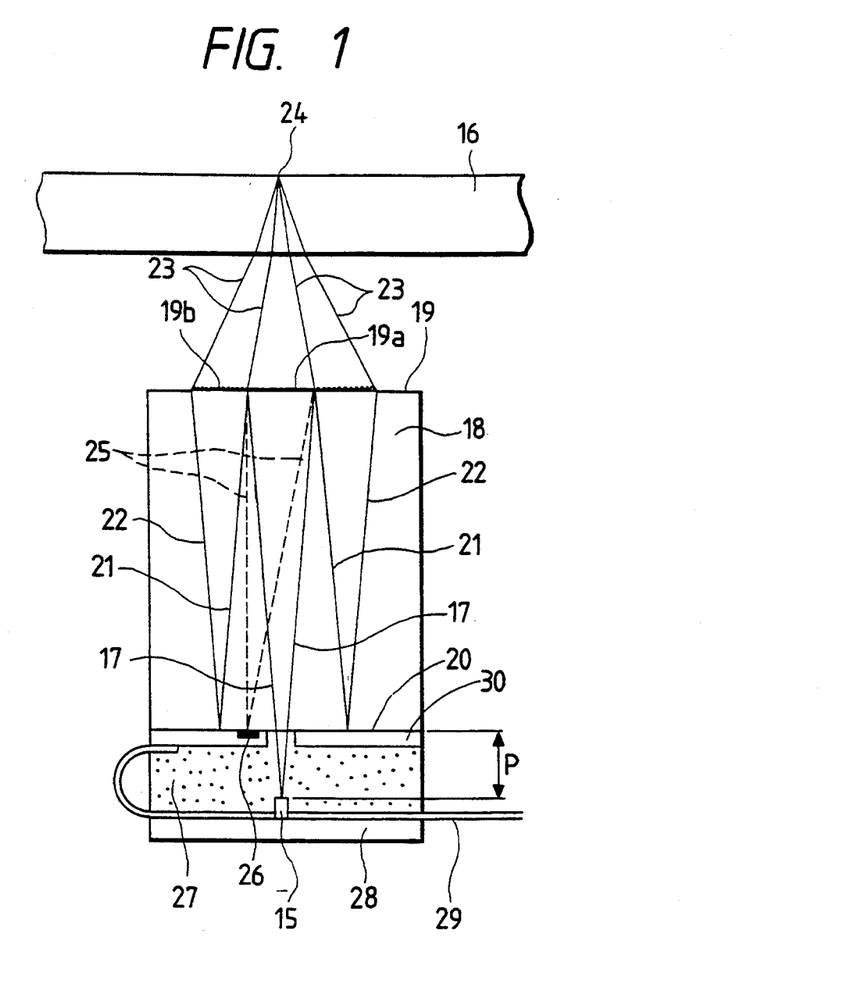
FIG. 1 shows an arrangement of an optical pickup according to a first embodiment of this invention.

An optical pickup according to a first embodiment of this invention will be described hereinbelow with reference to FIG. 1. First, the description will be made in terms of an optical path from a semiconductor laser 15 to an optical disc 16. In FIG. 1, light 17 emitted from the semiconductor laser 15 is diverged or spread out to reach a first surface 19 of a lens member (transparent member) 18. At the vicinity of the optical axis of the first surface 19, there is provided a reflection mirror section 19a having a reflection type hologram whereby the emitted light 17 is reflected thereon and directed as the 0-order diffracted light of the reflection type hologram toward a second surface 20 of the lens member 18 as shown at numeral 21. The second surface 20 is parallel to the first surface 19. Here, since except for window portions for the incidence and outgoing of the laser light from the semiconductor laser 15 the second surface 20 is mirror-coated, the light 21 is again reflected thereon so as to be directed toward the first surface 19 as shown at numeral 22. The light 22 is converged through a transmission type grating lens 19b, provided around the reflection mirror section 19a, so as to be focused on a point 24 of the optical disc 16 as illustrated at numeral 23. The grating lens 19b is of the type that is arranged such that the pitch gradually becomes smaller toward its circumferential portion to provide a focusing effect. Here, since the light reaching the center portion of the transmission type grating lens 19b is cut by the reflection mirror section 19a, an spot image is formed on the optical disc 16. The spot image can be made to have a diameter smaller than the Airy disc diameter of the spot image intensity distribution in an aberration-free circular aperture optical system.

Secondly, a description will be made in terms of the reflection optical path of the optical disc 16. The laser light modulated in accordance with the recorded information and reflected from the optical disc 16 passes through the transmission type grating lens 19b as illustrated at numeral 22 so as to be reflected on the second surface 20 of the lens member 18 to be directed toward the reflection mirror section 19a as illustrated at numeral 21, before being reflected on the reflection mirror 19a to become the first-order diffracted light of the reflection type hologram as designated at numeral 25. This first-order diffracted light 25 passes through an outgoing window, provided at the mirror-coated portion of the second surface 20 of the lens member 18, so as to be focused on a multi-divided photosensor 26. The reflection type hologram formed on the reflection mirror 19a comprises at least 2 areas whose interference periods are different from each other to provide the focusing error detection function and the tracking error detection function.

Figure 2:
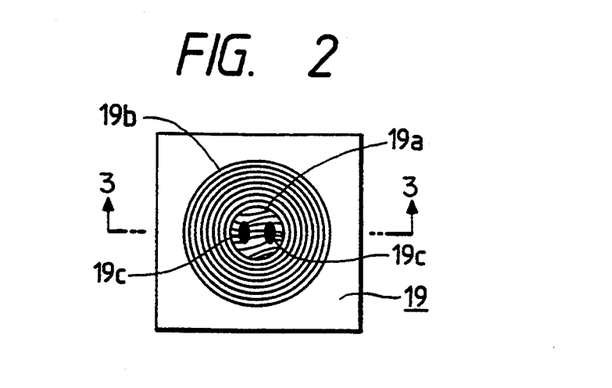
FIG. 2 a plan view showing a first surface of a lens member including a reflection type hologram provided on a portion of a reflection mirror section and a transmission type grating lens.
Figure 3:
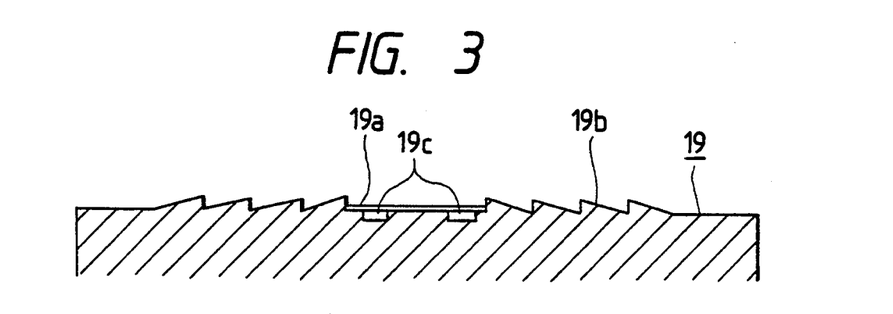
FIG. 3 is a cross-sectional view taken along A—A line in FIG. 2.

FIG. 2 shows the reflection type hologram (two holograms designated at 19c), provided on a portion of the reflection mirror section 19a, and the transmission type grating lens 19b, and FIG. 3 is a cross-sectional view taken along A—A line in FIG. 2. Here, a phase type hologram is used as the reflection type hologram 19c with a viewpoint of the diffraction efficiency, and a chirped in-line type lens whose cross section has a staircase- or saw-tooth-like configuration is used as the transmission type grating lens 19b with a viewpoint of the diffraction efficiency and the light-converging performance. The reflection hologram 19c and the transmission type grating lens 19b can be manufactured in accordance with the 2P (PHOTO POLYMERIZATION) method or the like.

Figure 4:
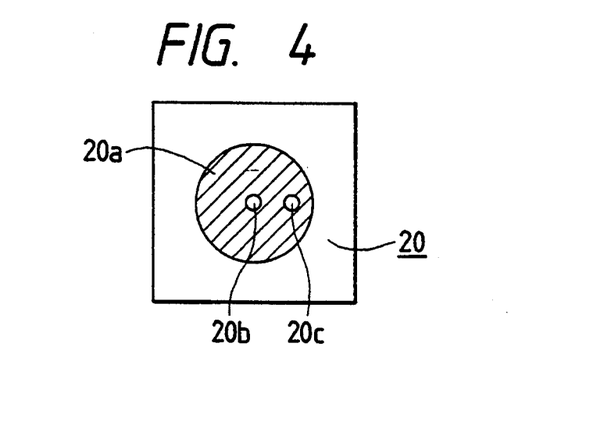
FIG. 4 is a plan view showing a second surface of the lens member including a mirror-coated portion.

FIG. 4 is a plan view showing the mirror-coated portion of the second surface 20 of the lens member 18. On the second surface 20 there is provided the reflection mirror-coated portion (designated at 20a), and in the reflection mirror-coated portion 20a there are provided an incident window 20b for the semiconductor laser 15 and an outgoing window 20c for the multi-divided photosensor 26.

Returning back to FIG. 1, a description will be made hereinbelow in terms of the semiconductor laser 15. The semiconductor laser 15 is fixed onto a radiating plate 28 for the heat radiation and reinforcement and electrically coupled to a thin flexible wiring member 29 placed on the radiating plate 28. The semiconductor laser 15 is separated by a predetermined distance P from the second surface 20 of the lens member 18, and a transparent resin such as an acrylic resin 27 is provided between the second surface 20 and the semiconductor laser 15 for sealing and adhesion. Further, the electric signal from the multi-divided photosensor 26 is electrically coupled through a sensor base 30 to the flexible wiring member 29.

Figure 5:
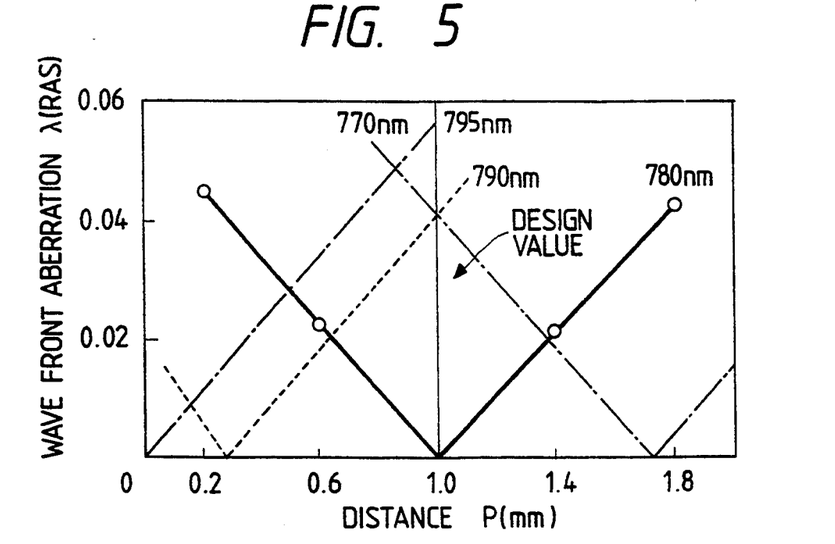
FIG. 5 is a graphic diagram showing variation of the wavefront aberration at a focusing point in accordance with variation of the distance between the second surface and a semiconductor laser.

Further, a description will be made in terms of the adjustment of the distance P between the second surface 20 and the semiconductor laser 15. FIG. 5 is a graphic diagram showing the variation of the wavefront aberration (RMS) at the focusing point in accordance with the variation of the distance P with respect to a grating lens designed under the conditions of NA (numerical aperture)=0.45, lens member length=5 mm, working distance=2 mm and laser wavelength=780 nm. As seen from FIG. 5, in the case that the wavelength becomes 770 nm shorter than the wavelength in design, the wavefront aberration becomes 0 when the distance P is about 1.72 mm. On the other hand, in the case that the wavelength becomes 790 nm longer than the wavelength in design, the wavefront aberration becomes 0 when the distance P is about 0.28. Thus, before fixing the semiconductor laser 15 to the second surface 20 through the transparent resin 27, the distance P is adjusted in accordance with the variation of the wavelength of the semiconductor laser 15, thereby reducing the wavefront aberration.

According to this embodiment, the light emitted from the semiconductor 15 is arranged to go and return within an optical system so as to ensure the necessary optical path length even if the distance between the semiconductor laser 15 and the transmission type grating lens 19b is short. Accordingly, it is possible to realize the size-reduction of the optical pickup. In addition, before adhering the semiconductor laser 15 by the transparent resin 27, in the case that the laser wavelength of the semiconductor laser 15 is longer than the designed reference wavelength of the semiconductor laser 15 with respect to the transmission grating lens 19b, the distance from the second surface 20 to the semiconductor laser 15 is arranged to be shorter than the designed reference value, and in the case of being shorter than the designed reference wavelength, the distance therebetween is arranged to be longer than the designed reference value, whereby it is possible to absorb the difference in oscillation wavelength between the semiconductor lasers and hence it is possible to reduce the wavefront aberration due to the difference in the wavelength. This effect can improve the productivity of the optical pickup, because it is not required to select a semiconductor laser to be used as the semiconductor laser 15 and perform the matching in wavelength between the lights from the transmission type grating lens 19b and the semiconductor laser 15.

Figure 6:
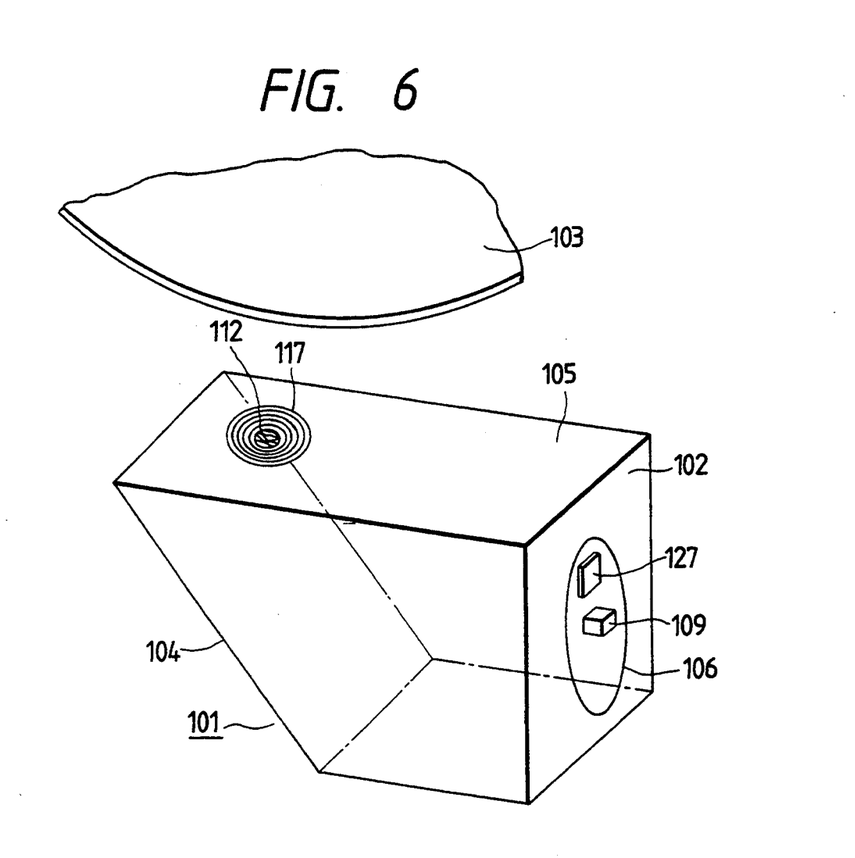
FIG. 6 is a perspective view showing an optical pickup according to a second embodiment of this invention.
Figure 7:
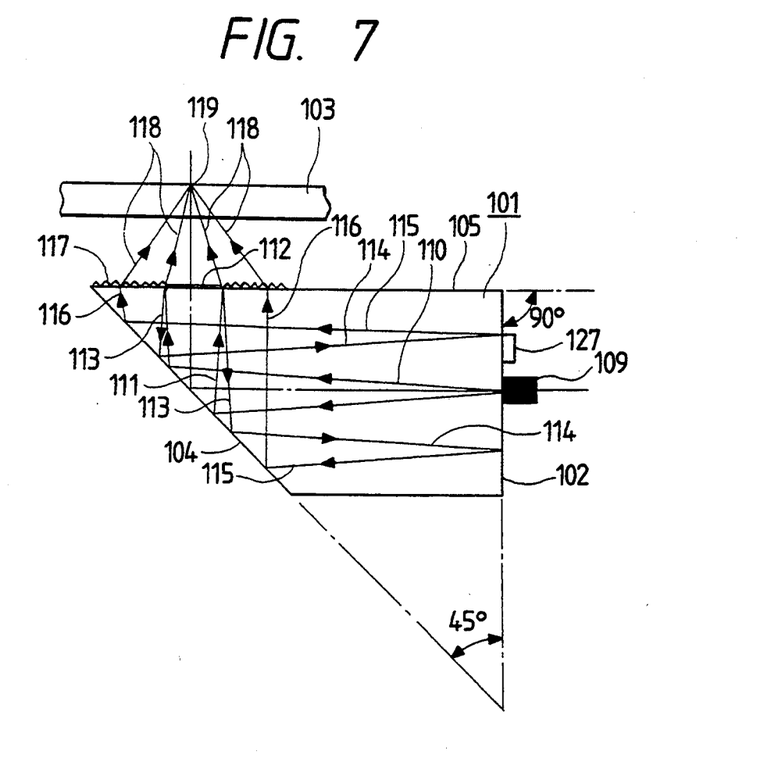
FIG. 7 shows an outgoing optical path in the FIG. 6 optical pickup.
Figure 11:
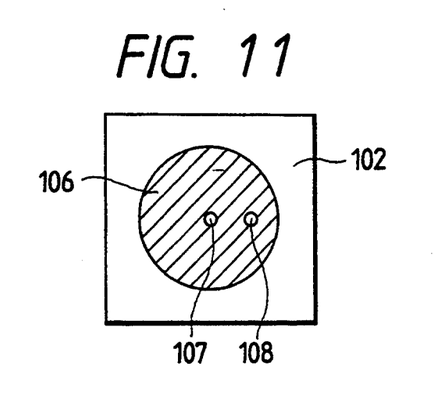
FIG. 11 is a plan view showing a mirror-coated portion provided on one surface of a prism in the FIG. 6 optical pickup.

Moreover, a description will be made hereinbelow in terms of an optical pickup according to a second embodiment of this invention. FIG. 6 is a perspective view showing the optical pickup according to the second embodiment of this invention and FIG. 7 shows the outgoing optical path in the FIG. 6 optical pickup. In FIGS. 6 and 7, numeral 101 represents a polygon (trapezoid) prism having first to third surfaces 102, 105 and 104. The first surface 102 is a surface perpendicular to an optical disc 103 surface, the second surface 105 is a surface meeting at right angles (90°) to the first surface 102, and the third surface 104 is a surface meeting at an angle of 45° to the first and second surfaces 102 and 105. On the first surface 102 there is provided a reflection mirror-coated portion 106 whereby light is reflected on the inner surface of the prism 101. In the reflection mirror-coated portion 106 there are provided a multi-divided photosensor 127 and a semiconductor laser 109 which are fixed through a transparent adhesive resin and which are placed on the same wiring base. FIG. 11 is a plan view showing the mirror-coated portion 106. As illustrated in FIG. 11, in the reflection mirror-coated portion 106 formed on the first surface 102 of the prism 101, there are provided an incident window 107 for the laser light from the semiconductor laser 109 and an outgoing window 108 for the laser light to the multi-divided photosensor 127.

Figure 9:
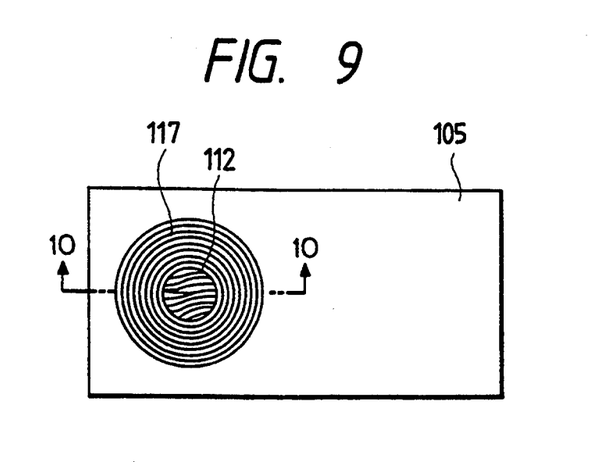
FIG. 9 shows a reflection type hologram and a transmission type grating lens provided on a second surface of a prism in FIG. 6 optical pickup.
Figure 10:
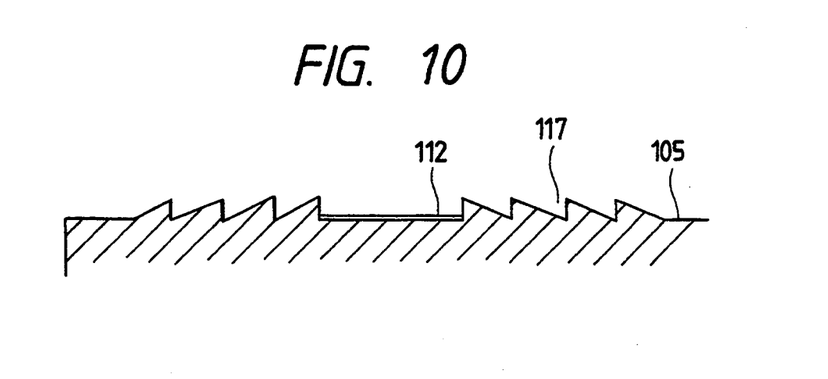
FIG. 10 is a cross-sectional view take along a line A—A in FIG. 9.

FIG. 9 shows a reflection type hologram 112 and a transmission type grating lens 117 provided on the second surface 105 of the prism 101, and FIG. 10 is a cross-sectional view take along a line A—A in FIG. 9. The reflection type hologram 112 is constructed as a phase type hologram with a viewpoint of the diffraction efficiency and the transmission type grating lens 117 is of the chirped in-line type that has a staircase- or sawtooth-like configuration to have a high light-converging performance and diffraction efficiency. The reflection type hologram 112 and the transmission type grating lens 117 are similarly manufactured in accordance with the 2P method or the like.

Here, a description will be made with reference to FIG. 7 in terms of the optical path from the semiconductor laser 109 up to the optical disc 103. Light 110 emitted from the semiconductor laser 109 is diverged or spread out so as to be directed to the third surface 104. The light 110 is reflected on the third surface 104 to be directed to the second surface 105 as illustrated at numeral 111. The reflected light 111 reaches the reflection type hologram 112 to be reflected thereon to become 0-order diffracted light 113. The 0-order diffracted light 113 is again directed to the third surface 104 to be reflected toward the first surface 102 as illustrated at numeral 114. The light 114 is reflected on the reflection mirror-coated portion 106 on the first surface 102 to reach the third surface 104 as shown at numeral 115. The light reflected on the third surface 104 is directed toward the second surface 105 as illustrated at numeral 116. The light 116 passes through the transmission type grating lens 117, provided around the reflection type hologram 112, to be focused on a point 119 on the optical disc 103 as illustrated at numeral 118. At this time, the light reaching the center portion of the transmission type grating lens 117 is cut by the reflection type hologram 112, and hence it is possible to reduce the diameter of the focused light spot on the optical disc 103.

Figure 8:
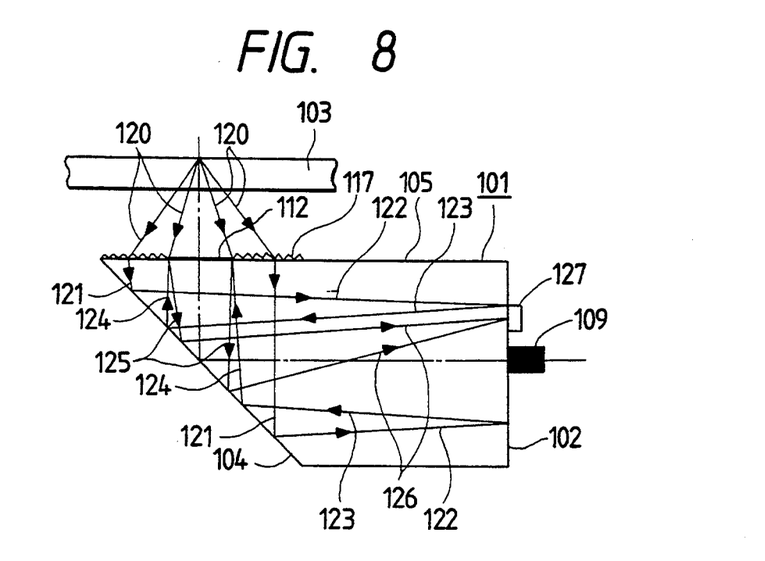
FIG. 8 shows a reflection path of light from an optical disc.

FIG. 8 shows a reflection path of the light from the optical disc 103. Reflected light 120 from the optical disc 103 which includes the information recorded on the optical disc 103 passes through the transmission type grating lens 117 to be directed toward the third surface 104 as illustrated at numeral 121. Light 122 reflected on the third surface 104 is directed to the reflection mirror-coated portion 106 on the first surface 102 before being again reflected on the third surface 104 to be directed to the reflection hologram 112 as shown at numeral 124. The light reflected on the reflection type hologram 112 becomes the first-order diffracted light 124 which is in turn reflected on the third surface 104 to pass through the multi-divided photosensor outgoing window 108 to be focused on the multi-divided photosensor 127 as illustrated at numeral 126. This reflection type hologram 112 comprises 2 areas whose interference periods are different from each other to provide a focusing error detection function and a tracking error detection function.

Figure 12:
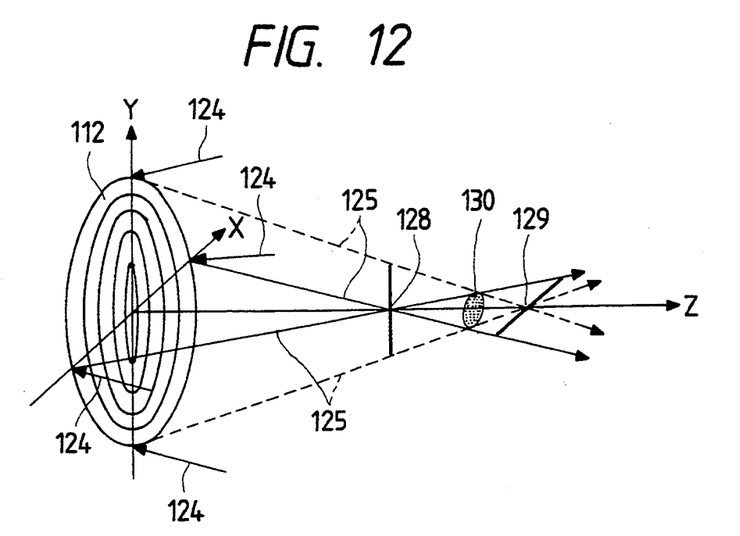
FIG. 12 is an illustration for describing the function of a reflection type hologram.

A method of detecting the focusing error will be described hereinbelow with reference to FIG. 12 which is an illustration for describing the function of the reflection type hologram 112. In FIG. 12, orthogonal axes X, Y are taken on the surface of the reflection type hologram 112 and further a Z axis is taken which is orthogonal to the X and Y axes. The hologram pattern of the reflection type hologram 112 is arranged to generate the astigmatic aberration such that the X-axis component of the first-order diffracted light 125 is focused on an X-axis focus 128 and the Y-axis component thereof is focused on a Y-axis focus 129. The cross section of the first-order diffracted light 125 at the X-axis focus 128 has a linear configuration extending in the Y-axis directions and the cross section of the first-order diffracted light 125 at the Y-axis focus 129 has a linear configuration extending in the X-axis direction. Between the X-axis focus 128 and the Y-axis focus 129 the first-order diffracted light 125 has a circular cross section as illustrated at numeral 130.

Figure 13A:
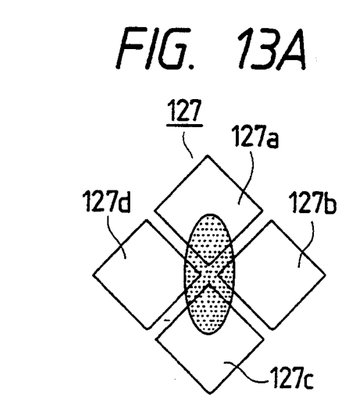
FIGS. 13A to 13C are illustrations for describing focusing states between an optical disc and a transmission type grating lens.
Figure 13B:
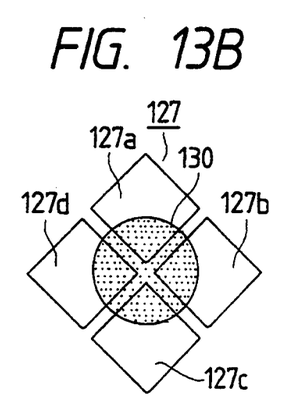
Figure 13C:
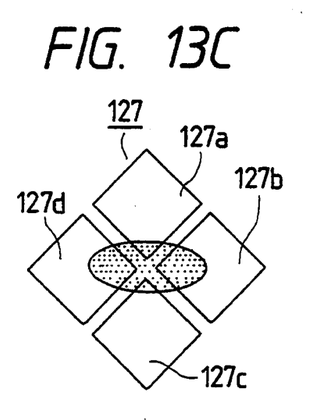

Now, when the transmission type grating lens 117 takes the focusing state with respect to the optical disc 103, the position of the multi-divided photosensor 127 is adjusted so that the multi-divided photosensor 127 is placed at the circular cross section 130 position. First, as illustrated in FIG. 13B, when taking the focusing state, the positional relation of the respective division portions 127a to 127d of the multi-divided sensor 127 with respect to the circular cross section 130 is adjusted so that the electric outputs of the respective division portions 127a to 127d become equal to each other. In the case that the optical disc 103 moves away from the transmission type grating lens 117, the X-axis focus 128 and the Y-axis focus 129 are respectively close to the reflection type hologram 112 and hence the light spot has an elliptical configuration extending in the X-axis direction as illustrated in FIG. 13C. Thus, the sum of the electric outputs of the division portions 127a and 127c becomes smaller than the sum of the electric outputs of the division portions 127b and 127d. On the other hand, in the case that the optical disc 103 approaches the transmission type grating lens 117, since the X-axis focus 128 and the X-axis focus 129 are respectively separated from the reflection type hologram 112, the light spot has an elliptical configuration extending in the Y-axis direction as illustrated in FIG. 13A. Thus, the sum of the electric outputs of the division portions 127a and 127c becomes greater than the sum of the electric outputs of the division portions 127b and 127d. The focusing error detection can be effected on the basis of the relation in magnitude between the sum of the electric outputs of the division portions 127a, 127c and the sum of the electric outputs of the division portions 127b, 127d. This is known as the so-called astigmatic method. Similarly, it is possible to perform the tracking error detection in accordance with the so-called push-pull method.

As described above, according to this embodiment, since the laser light is arranged to be reflected within the prism 101, it is possible to ensure the necessary optical path length. In addition, since the prism 101, semiconductor laser 109 and multi-divided photosensor 127 are integrally constructed, it is possible to construct an optical pickup having a extremely small dimension.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An optical pickup comprising:
light-emitting means for emitting light;
lens means for focusing incident light on an optical disc;
a first reflection surface for reflecting the light from said light-emitting means;
a second reflection surface for reflecting the light, reflected by said first reflection surface, towards said lens means; and
light-receiving means for receiving the light reflected from said optical disc;
wherein said first reflection surface is equipped with a hologram whereby light reflected from said optical disc and passing through said lens means and reflected from said reflection surface is diffracted toward said light-receiving means, and said second reflection surface is equipped with an incident window through which light from said light-emitting means passes and an outgoing window through which light diffracted by said hologram passes, said light-emitting means being disposed in opposed relation to said incident window and said light-receiving means being disposed in opposed relation to said outgoing window.

2. An optical pickup comprising:
light-emitting means disposed in opposed relation to an optical disc for emitting light toward said optical disc;
light-receiving means disposed in opposed relation to said optical disc for receiving light reflected from said optical disc;
a transparent member disposed between said light-emitting means, said light-receiving means and said optical disc, said transparent member having a first surface facing said optical disc and a second surface facing said light-emitting means and said light-receiving means, said first and second surfaces being parallel to each other;
a first circular reflection surface disposed on said first surface of said transparent member for reflecting the light from said light-emitting means;
a reflection type hologram formed in said first reflection surface;
a grating lens disposed around said first reflection surface for focusing light on said optical disc;
a second reflection surface disposed on said second surface of said transparent member for reflecting light, reflected from said first reflection surface, toward said grating lens;
an incident window formed in said second reflection surface for leading the light from said light-emitting means into said transparent member; and
an outgoing window formed in said second reflection surface for leading diffracted light from said reflection type hologram to said light-receiving means.

3. An optical pickup as claimed in claim 2, wherein a distance from said second reflection surface to said light-receiving means is adjusted in accordance with the relation between a wavelength of the light to be emitted from said light-emitting means and a design wavelength of said grating lens, said second reflection surface and said light-receiving means being fixed to each other through a transparent resin after the adjustment.

4. An optical pickup as claimed in claim 3, wherein, when the wavelength of the light to be emitted from said light-emitting means is longer than the design wavelength of said grating lens, the distance from said second reflection surface to said light-receiving means is arranged to be shorter than a design value, and when the wavelength of the light to be emitted from said light-emitting means is shorter than the design wavelength of said grating lens, the distance from said second reflection surface to said light-receiving means is arranged to be longer than the design value.

5. An optical pickup comprising:
a polygon prism having first to third surfaces, said second surface meeting at an angle of 90° to said first surface and third surface meeting at an angle of 45° to said first and second surfaces;
light-emitting means disposed on said first surface for emitting light;
light-receiving means disposed on said first surface for receiving light from an optical disc;
a first reflection surface disposed on said third surface for reflecting the light from said light-emitting means;
a second circular reflection surface disposed on said second surface for reflecting light reflected on said first reflection surface;
a reflection type hologram provided in said second reflection surface;
a grating lens provided around said second reflection surface for focusing incident light on said optical disc; and
a third reflection surface disposed on said first surface, said third reflection surface including an incident window leading the light from said light-emitting means into said polygon prism, and an outgoing window leading diffracted light from said reflection type hologram to said light-receiving means.

* * * * *